US008001295A

United States Statutory Invention Registration [19]

Design

Kingsley

[11] Reg. Number: H1295

[43] Published: Apr. 5, 1994

[54] FISHERMAN'S PLIERS

[76] Inventor: Gerald E. Kingsley, P.O. Box 158, Lebanon, Oreg. 97355

[21] Appl. No.: 9,541

[22] Filed: Feb. 26, 1993

[52] U.S. Cl. ..... D8/52

*Primary Examiner*—Michael J. Carone
*Attorney, Agent, or Firm*—Terry M. Gernstein

[57] CLAIM

The ornamental design for a fisherman's pliers, as shown and described.

1 Claim, 4 Drawing Sheets

Figure 1:
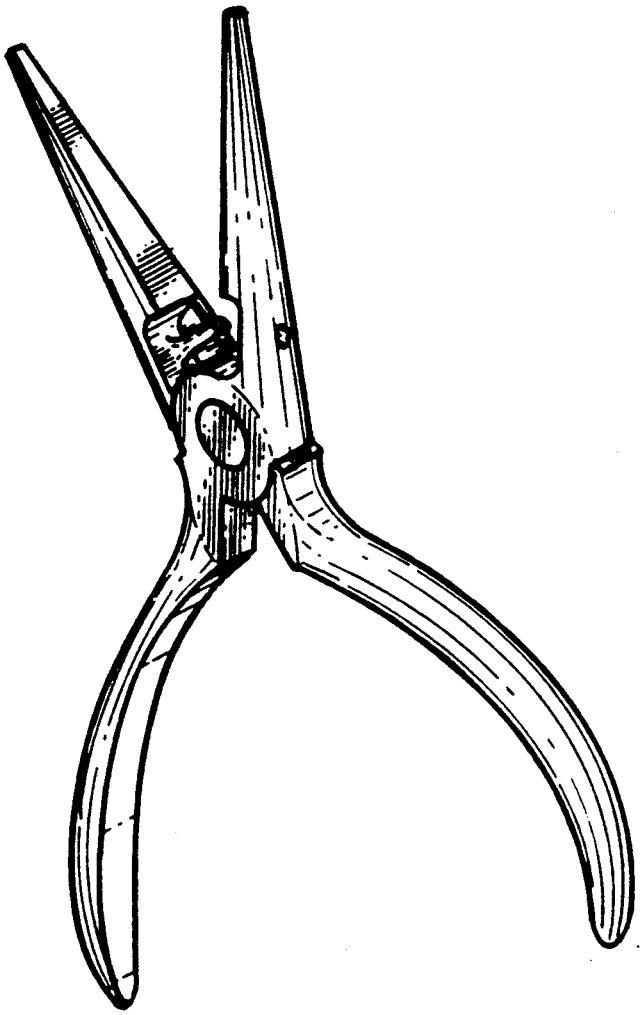
Figure 2:
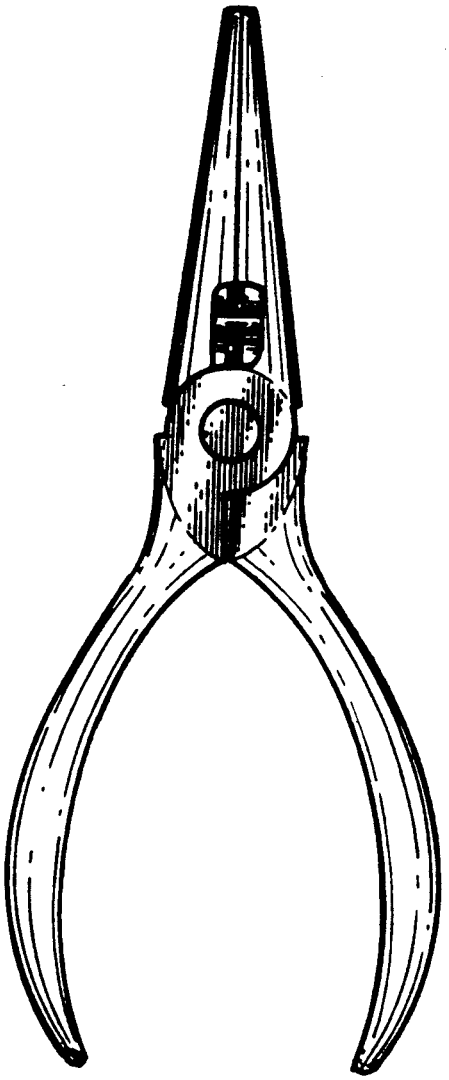
Figure 6:
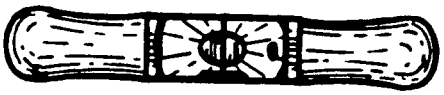
Figure 3:
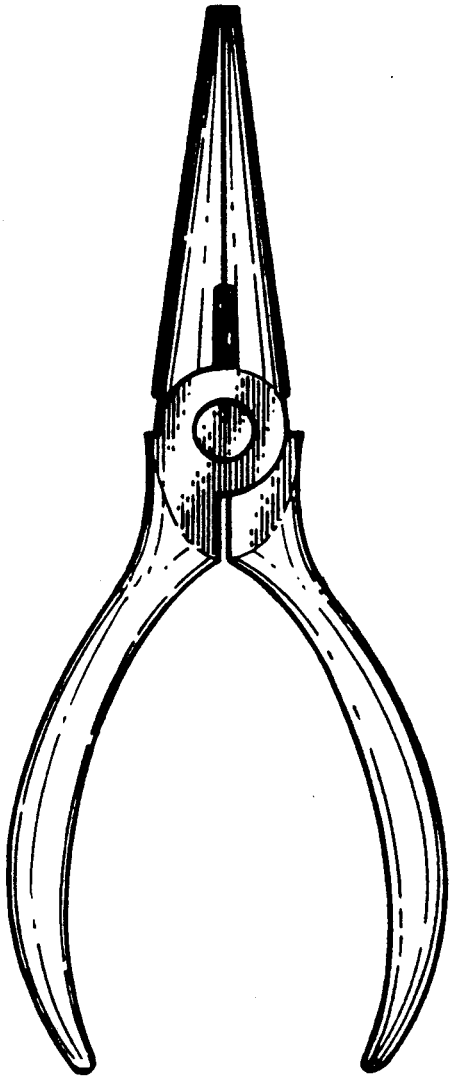
Figure 7:
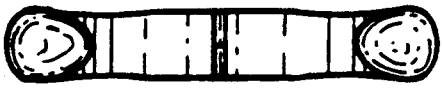
Figure 4:
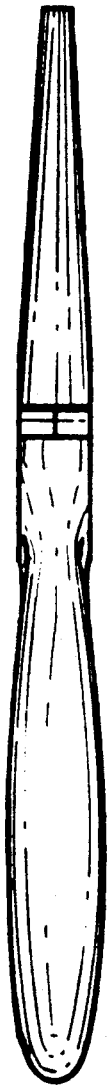
Figure 5:
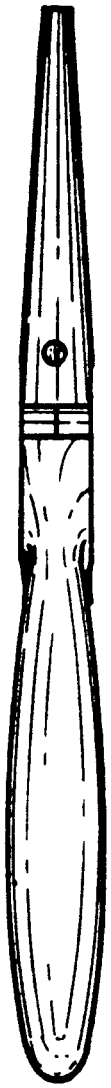

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.